UNITED STATES PATENT OFFICE.

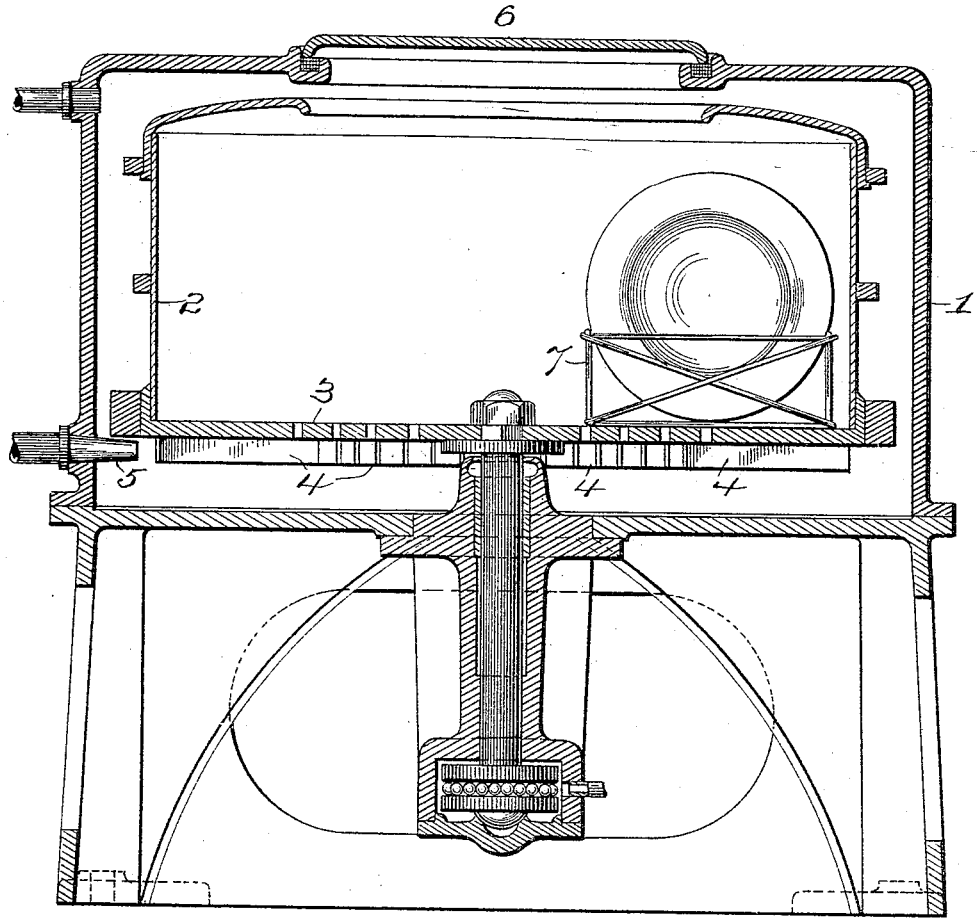

JOHN WILLIAM PITTOCK, OF PHILADELPHIA, PENNSYLVANIA.

WASHING APPARATUS.

No. 817,801.           Specification of Letters Patent.           Patented April 17, 1906.

Application filed September 12, 1905. Serial No. 278,132.

*To all whom it may concern:*

Be it known that I, JOHN WILLIAM PITTOCK, a resident of Philadelphia, in the county of Philadelphia and State of Pennsylvania, have invented certain new and useful Improvements in Washing Apparatus; and I do hereby declare the following to be a full, clear, and exact description of the invention, such as will enable others skilled in the art to which it appertains to make and use the same.

My invention relates to improvements in washing apparatus, and more particularly to an apparatus for washing dishes, table-ware, &c., the object of the invention being to provide improvements of this character in which the articles are cleaned by steam and their receptacle revolved by the steam imparting centrifugal action thereto.

With this object in view the invention consists in certain novel features of construction and combinations and arrangements of parts, as will be more fully hereinafter described, and pointed out in the claims.

The accompanying drawing is a view in vertical section, illustrating my improvements.

1 represents a steam-tight casing having a central journal preferably mounted upon roller-bearings and made steam-tight, and a receptacle 2 is secured upon the journal in casing 1 and provided with a perforated bottom 3, as shown. Around the bottom 3 an annular series of inclined blades or vanes 4 are located, forming a turbine-wheel to receive the steam impact from a nozzle 5, or several nozzles may be employed, if preferred, to revolve the receptacle 2, and this steam is also used to clean the articles in receptacle 2, as will hereinafter appear.

The casing 1 has a removable steam-tight top or cover 6, and receptacle 2 may be open at its top or have a removable cover, as preferred. The dishes and other articles to be washed are placed in receptacle 2 upon suitable supporting-trays 7, through which the steam can freely pass, and my improved apparatus is ready for operation.

The steam discharged through nozzle or nozzles 5 by its impact against the inclined blades or vanes 4 imparts a rapid rotation of the receptacle 2, and the steam after passing between the blades or vanes enters receptacle 2 through its perforated bottom 3 and comes into contact with the rapidly-rotated articles and effectually cleanses them by its contact and centrifugal action, and the steam escapes at any suitable outlet 8.

The particular construction of the casing and receptacle and the relative sizes of these and other parts are of course immaterial, as this application is intended to cover, broadly, any apparatus in which the articles are cleaned by the contact of steam and given centrifugal action by steam, and I do not restrict myself to any particular construction or arrangement of parts, but consider myself at liberty to make such slight changes and alterations as fairly fall within the spirit and scope of my invention.

Having fully described my invention, what I claim as new, and desire to secure by Letters Patent, is—

1. In a washing-machine, the combination of a receptacle to contain articles to be cleaned, and having a perforated bottom, a turbine under said perforated bottom and means for directing steam against it.

2. In a washing-machine, the combination of a rotary receptacle, a steam-turbine under said receptacle, a steam-nozzle for directing steam against the turbine, said receptacle having a perforated bottom to permit the passage of steam upwardly through the receptacle.

3. In a washing-machine, the combination with a casing, of an upright receptacle for articles to be cleaned, having a perforated bottom and provided with a rotary mounting in the casing, an annular series of vanes under the perforated bottom of the receptacle, and a nozzle to direct steam against said vanes.

4. In an apparatus of the character described, the combination with a casing, of a revolving journal in the center of the casing-bottom, a rotary receptacle secured on the journal in the casing and having a perforated bottom and open top, an annular series of blades or vanes around the bottom of the receptacle, and a steam-nozzle directing steam against said blades or vanes and up through the perforated bottom of the receptacle.

In testimony whereof I have signed this specification in the presence of two subscribing witnesses.

JOHN WILLIAM PITTOCK.

Witnesses:
     C. S. TARVES,
     M. E. MORRISON.